(12) United States Patent
Trigui et al.

(10) Patent No.: US 6,378,488 B1
(45) Date of Patent: Apr. 30, 2002

(54) DIRECT INJECTION SPARK IGNITION ENGINE

(75) Inventors: Nizar Trigui, Ann Arbor; Jianwen Yi, Canton; Zhiyu Han, Plymouth, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/649,930

(22) Filed: Aug. 29, 2000

(51) Int. Cl.$^7$ ................................................ F02B 23/10
(52) U.S. Cl. ..................................... 123/302; 123/193.5
(58) Field of Search ........................... 123/193.5, 295, 123/298, 301, 302, 305, 306, 308, 432

(56) References Cited

U.S. PATENT DOCUMENTS 4,957,081 A * 9/1990 Ito et al. ..................... 123/302
5,063,886 A * 11/1991 Kanamaru et al. ..... 123/65 VD

FOREIGN PATENT DOCUMENTS

JP 11-193707 A 7/1999

* cited by examiner

*Primary Examiner*—Tony M. Argenbright
(74) *Attorney, Agent, or Firm*—Julia Voutyras; Allan J. Lippa

(57) ABSTRACT

A method is presented for improving performance of direct injection spark ignition internal combustion engines at high load conditions by increasing the degree of homogeneity of the air-fuel mixture during the intake stroke of the engine. The improved performance is achieved by adding a deflector designed to reduce intake air impinging upon the fuel spray and deflecting it to the intake side of the combustion chamber, thus facilitating better fuel circulation throughout the combustion chamber. This method improves engine performance at high load engine operating conditions.

13 Claims, 2 Drawing Sheets

DIRECT INJECTION SPARK IGNITION ENGINE

FIELD OF THE INVENTION

The present invention relates to direct injection spark ignition engines and more particularly to, improving performance of such engines at high engine loads.

BACKGROUND OF THE INVENTION

Conventional direct injection spark ignition engines typically have at least one combustion chamber having at least one air intake port for introducing air into the combustion chamber and a fuel injector port for directly injecting fuel into the combustion chamber. Fuel injection during compression stroke causes stratas of different air-fuel mixtures to be formed in the combustion chamber, the layer closest to the spark plug containing a stoichiometric or slightly rich of stoichiometry mixture, and with subsequent layers containing progressively leaner mixtures. Stratified mode is preferred for low engine loads and provides improved fuel economy.

At high engine loads, typically greater than 50% of full engine load, a homogeneous air-fuel mixture is provided in the combustion chamber by injecting fuel into the chamber during the intake stroke. At high loads, the air-fuel mixture is at or slightly rich of stoichiometry. When the air intake ports are open, the injected fuel spray is deformed by the incoming air stream and is blown to the intake port side. This prevents fuel droplets and vapor from penetrating across the cylinder and causes air-fuel mixture stratification. This condition can result in loss of power, and is particularly pronounced at high speed, high load conditions.

Various methods have been disclosed in the art of direct injection spark ignition engine design for improving engine performance at high load conditions by improving air-fuel mixture homogeneity. One method is described in Japan Patent Application No. 11,193,707 A, wherein improved air-fuel mixture homogeneity is achieved by providing a deflector at the bottom of the inner periphery of an intake valve of an intake air port deviated toward the side where a fuel injection valve is located. This causes the intake air to make a detour around the fuel injection valve, allowing the fuel to be injected at a wide angle and therefore improving air-fuel mixture homogeneity.

The inventors herein have recognized a disadvantage with this approach. Namely, the deflector is placed at the inner periphery of an air intake port in the vicinity of the intake valve, which has the problem of restricting the amount of air that can be injected into the combustion chamber, and can therefore cause the engine to be underpowered, most severely so at high speed, high engine loads.

SUMMARY OF THE INVENTION

An object of the present invention is to provide a method for improving performance of a vehicle equipped with a direct injection spark ignition engine.

The above object is achieved and disadvantages of prior approaches overcome by a direct injection, spark ignition internal combustion engine having a minimum of one combustion chamber formed in a cylinder block, and having a cylinder head attached to the block, the chamber comprising: a minimum of one air intake port formed in the cylinder head for introducing an air stream into the combustion chamber; a fuel injection port formed in the cylinder head for directly injecting a fuel spray into the combustion chamber; and an intake air deflector formed in the cylinder head between said air intake port and said fuel injection port, said deflector sized and positioned such as to reduce said air stream impinging on said fuel spray during an intake stroke of the engine.

In another aspect of the present invention the above object is achieved and disadvantages of prior approaches overcome by a method of forming a homogeneous air-fuel mixture in a combustion chamber of a direct injection spark ignition engine, the method comprising: inducting an air stream into the combustion chamber, said air stream impinging on a first side of an intake air deflector; and injecting a fuel spray into the combustion chamber, said fuel impinging on a second side of said intake air deflector.

In yet another aspect of the present invention, the above object is achieved and disadvantages of prior approaches overcome by a method of forming a homogeneous air-fuel mixture in a combustion chamber of a direct injection, spark ignition internal combustion engine, the method comprising: inducting an air stream through an air intake port housed in a lower plateau protruding into the combustion chamber, said lower plateau formed in a cylinder head; and simultaneously injecting a fuel spray through a fuel injection port housed in an upper plateau, said upper plateau formed in said cylinder head and separated from said first plateau by a step of about 1–25 millimeters in height.

An advantage of the above aspects of the invention is that by preventing the intake air from deflecting the fuel spray to the intake side of the combustion chamber during the intake stroke of the engine, fuel droplets and vapor are allowed to be better distributed throughout the combustion chamber, and thus better air-fuel mixture homogenization is achieved. Since the deflector is formed in the cylinder head between the fuel injector port and the air intake port(s), and not inside the air intake port as in the prior art invention, the flow of intake air is not restricted, and thus higher output torque and better engine performance at high engine loads is achieved.

Other objects, features and advantages of the present invention will be readily appreciated by the reader of this specification.

BRIEF DESCRIPTION OF THE DRAWINGS

The object and advantages of the invention claimed herein will be more readily understood by reading an example of an embodiment in which the invention is used to advantage with reference to the following drawings, wherein:

DESCRIPTION OF THE PREFERRED EMBODIMENTS

Figure 1:
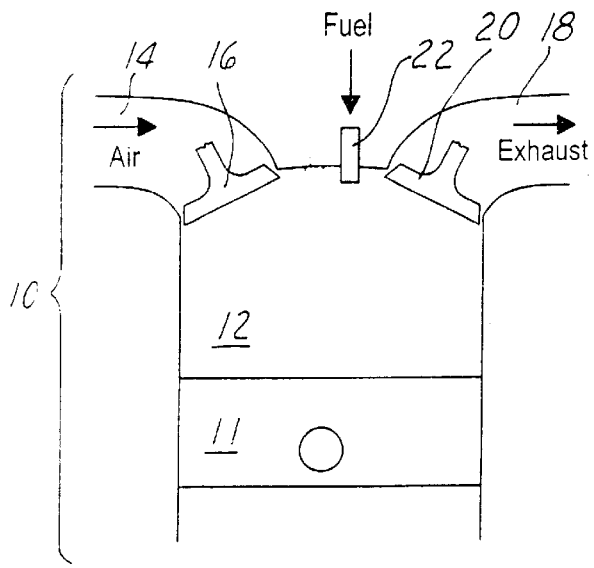
FIG. 1 shows a schematic cross-sectional diagram of an exemplar conventional combustion chamber of a direct injection, spark ignition internal combustion.

Referring now to FIG. 1, there is shown a schematic cross-sectional diagram of a direct injection internal combustion engine 10 comprising a minimum of one combustion chamber 12 whose volume is varied incident to a reciprocating action of a piston 11 that defines a floor of the combustion chamber 12. As is also illustrated within the schematic cross-sectional diagram of FIG. 1, there is introduced into the combustion chamber 12 air through an air intake conduit 14 (typically and preferably part of an intake manifold) that terminates in and defines an air intake port that is formed within the combustion chamber 12. As is understood by a person skilled in the art, and as is also illustrated within the schematic cross-sectional diagram of FIG. 1, air is introduced into the combustion chamber 12 by action of an intake valve 16, which periodically seals and opens the air intake port. There is also shown within the schematic cross-sectional diagram of FIG. 1 an exhaust conduit 18 (typically and preferably part of an exhaust manifold) that terminates in and defines an exhaust port that is formed within the combustion chamber 12. Analogously with the air intake port, the exhaust port is periodically sealed and opened by an exhaust valve 20.

In addition, there is also shown within the schematic cross-sectional diagram of FIG. 1 a fuel injector 22 that directly injects fuel into the combustion chamber 12 (typically at least in part when air is being introduced into the combustion chamber through the air intake port). The fuel injector 22 in turn defines a fuel injector port which is also formed within the combustion chamber 12.

As is understood by a person skilled in the art, although the preferred embodiment of the present invention discloses the present invention within the context of air as being introduced into the combustion chamber, within the context of the present invention as disclosed and claimed, "air" is intended in general to include any oxidant which provides for combustion of fuel injected into the combustion chamber 12. Thus "air" may include, but is not limited to: (1) ambient air; (2) turbocharged or supercharged compressed air; and (3) oxidant enriched air (such as but not limited to oxygen oxidant enriched air and nitrous oxide oxidant enriched air).

As is understood by a person skilled in the art, there is omitted from the direct injection internal combustion engine whose schematic cross-sectional diagram is illustrated in FIG. 1 an ignition source, such as but not limited to a spark plug or a glow plug, for purposes of clarity.

Figure 2:
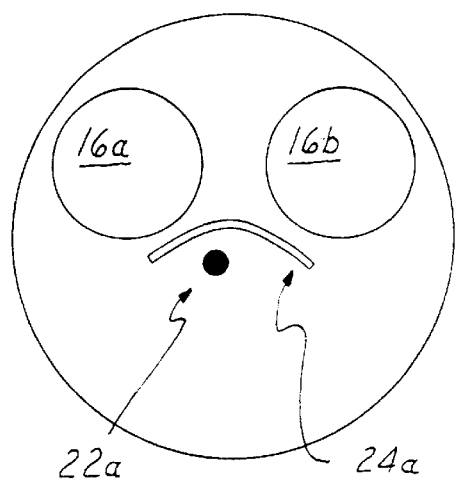
FIG. 2, FIG. 3 and FIG. 4 show a series of schematic plan-view diagrams of embodiments in accord with the present invention.
Figure 3:
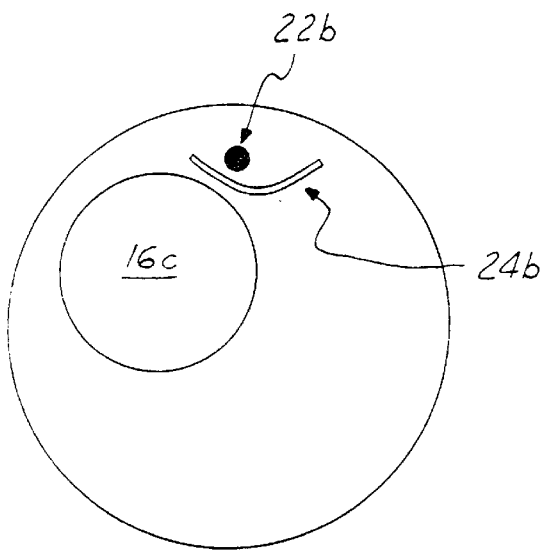
Figure 4:
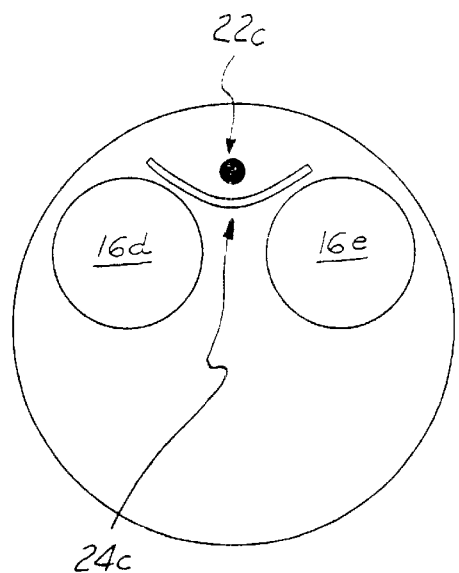

Referring now to FIGS. 2–4, there is shown a series of schematic plan-view diagrams of example embodiments in accord with the present invention. For purposes of clarity, within schematic plan-view diagram of FIGS. 2–4, there are illustrated only intake valves (which define and cover air intake ports), fuel injectors (which define fuel injector ports) and intake air deflectors (which are illustrated as baffles). Thus, there is omitted from the schematic plan-view diagrams of FIGS. 2–4 various conventional exhaust valves and ignition sources.

As is illustrated within the schematic plan-view diagram of FIG. 2 there is shown in this example a fuel injector 22a approximately centered within a ceiling of a combustion chamber provided by the cylinder head, with a pair of intake valves 16a and 16b disposed radially outward asymmetrically therefrom and wherein, in accord with the present invention, an intake air deflector 24a separates the fuel injector 22a from both of the intake valves 16a and 16b.

As is illustrated within the schematic plan-view diagram of FIG. 3, there is shown in another example a fuel injector 22b positioned at a periphery of a ceiling of a combustion chamber provided by the cylinder head and separated from a single intake valve 16c also positioned at a separate periphery of the top of the combustion chamber by an intake air deflector 24b.

Finally, as is illustrated within the schematic plan-view diagram of FIG. 4, there is shown in still another embodiment a fuel injector 22c also positioned at a periphery of a ceiling of a combustion chamber, but in comparison with the schematic plan-view diagram of FIG. 3 separated from a pair of intake valves 16d and 16e by an intake air deflector 24c of curvature analogous to the curvature of the deflector 24a as illustrated within the schematic plan-view diagram of FIG. 2.

The dispositions of the intake valves, the fuel injectors and the intake air deflectors as illustrated within the schematic plan-view diagrams of FIGS. 2–4 are intended as illustrative of the present invention rather than limiting of the present invention. Additional geometric configurations of the foregoing components are also possible within a combustion chamber within a direct injection internal combustion engine in accord with the present invention.

Figure 5:
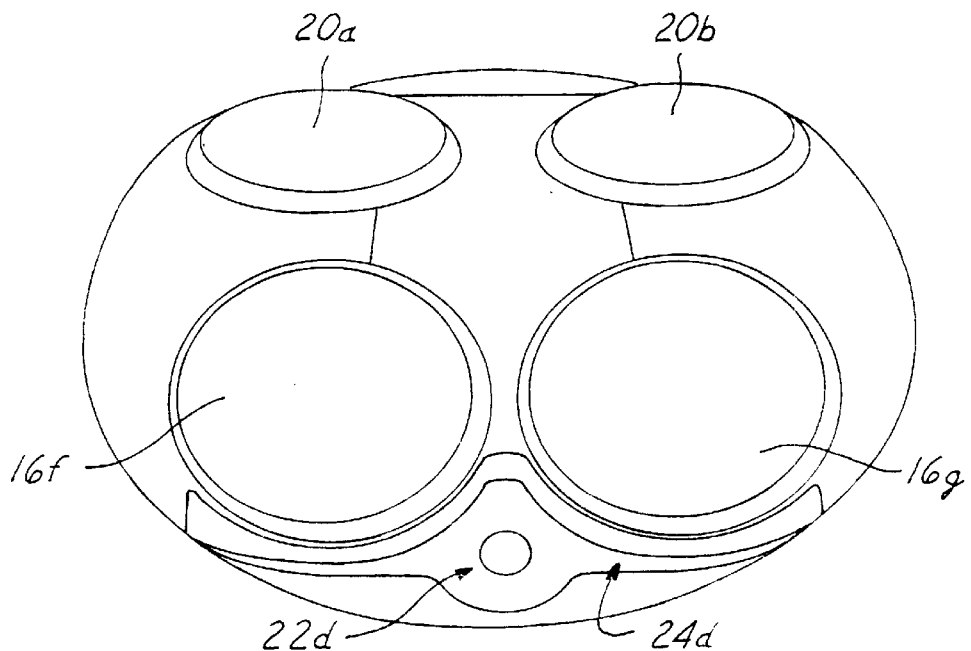
FIG. 5 shows a schematic perspective-view diagram of a working example in accord with an example of the present invention.

Referring now to FIG. 5, there is shown a schematic perspective-view diagram of a combustion chamber that may be employed within a direct injection internal combustion engine in accord with an example of the present invention. As is illustrated within the schematic perspective-view diagram of FIG. 5, the combustion chamber ceiling has a pair of exhaust valves 20a and 20b which periodically seal a pair of exhaust ports, along with a pair of intake valves 16f and 16g which periodically seal a pair of intake ports, further wherein the pair of intake ports which are periodically sealed by the pair of intake valves 16f and 16g is separated from a fuel injector 22d which defines a fuel injector port by an intake air deflector 24d (illustrated as a stepped baffle) having a bi-cusped shape which generally conforms with the pair of air intake ports.

Within the combustion chamber ceiling, whose schematic perspective-view diagram is illustrated in FIG. 5, each of the pair of intake ports typically has a diameter of about 30 millimeters, and the intake air deflector 24d has a step height of about 6 millimeters which protrudes into a combustion chamber in a fashion which provides a plateau of the pair of intake ports and the pair of exhaust ports above the fuel injector port.

In order to demonstrate the value of the present invention in providing enhanced mixing of an air/fuel mixture within a combustion chamber within a direct injection internal combustion engine, and thus an enhanced performance and enhanced economy of the direct injection internal combustion engine, there was undertaken a computer simulation of mixing of an air/fuel mixture within a combustion chamber within a direct injection internal combustion engine while employing the combustion chamber ceiling configuration as illustrated within the schematic perspective-view diagram of FIG. 5, in comparison with an otherwise equivalent combustion chamber ceiling configuration, but absent the deflector 24d, and where the pair of exhaust ports, the pair of intake ports and the fuel injector port were thus all positioned on a contiguous surface absent a deflector, such as the intake air deflector 24d, interposed therebetween. The computer simulation employed software developed by Ford Motor Company. The in-house developed software is to simulate the in-cylinder dynamics including, but not limited to, a number of complex, closely coupled physical and chemical processes of internal combustion engines, with example of direct injection internal combustion engines. These processes include the transient three-dimensional dynamics of evaporating fuel spray interacting with flowing multi-component gases undergoing mixing, ignition, chemical reactions, and heat transfer. The software has the ability to calculate such flows in engine cylinders with arbitrarily shaped piston geometries, including the effects of turbulence and wall heat transfer. In order to simulate the engine working process, a 3-D mesh needs to be generated before the computation starts. The software also has the capability to restructure the mesh as the piston and valve move.

Figure 6:
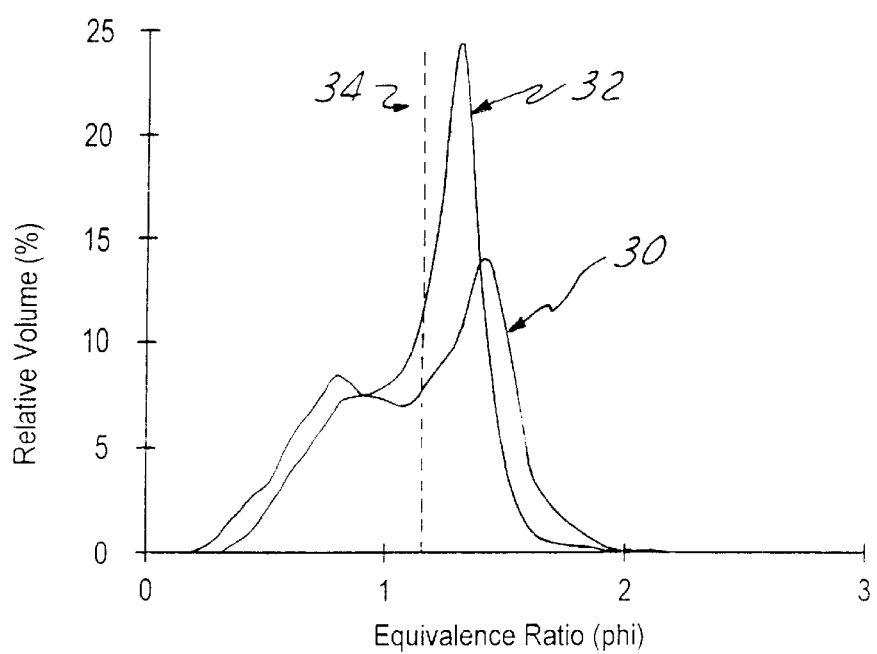
FIG. 6 shows a plot of Relative Volume versus Equivalence Ratio for mixing of an air-fuel mixture at 20 degrees before Top Dead Center of Compression Stroke within a combustion chamber within a direct injection internal combustion engine in accord with the example of the present invention compared to that for a conventional system.

Shown in FIG. 6 is a plot of Relative Volume versus Equivalence Ratio for an air-fuel mixture for the pair of combustion chambers as noted above when employed within a direct injection internal combustion engine having a cylinder bore of 89 millimeters and a piston stroke of 76 millimeters operated at 6000 revolutions per minute at wide open throttle without variable valve timing. The fuel is injected through the fuel port during the intake stroke. The relative volume distributions as illustrated in FIG. 6 are determined for an air-fuel mixture ratio of 12.6 at a crank angle of 20 degrees before top dead center (TDC) within the direct injection internal combustion engine.

As is illustrated within the plot of FIG. 6, the curve corresponding with reference numeral 30 corresponds with air-fuel mixing within the combustion chamber having the combustion chamber ceiling as illustrated within the schematic perspective-view diagram of FIG. 5, but absent the deflector 24d. Similarly, the curve corresponding with reference numeral 32 corresponds with air-fuel mixing within the combustion chamber having formed therein the combustion cylinder top as illustrated within the schematic perspective-view diagram of FIG. 5. For comparison purposes, in the event of perfect mixing within a combustion chamber there would be observed, in accord with the phantom line which corresponds with reference numeral 34, a single peak at equivalence ratio of 1.16. Insofar as within the plot of FIG. 6 the curve corresponding with reference numeral 32 more closely approximates the ideal mixing condition of the phantom line which corresponds with reference numeral 34 in comparison with the curve corresponding with reference numeral 30, there is provided within the context of the example of the present invention an enhanced mixing within a direct injection internal combustion engine and thus an enhanced performance and an enhanced economy of the direct injection internal combustion engine incident to implementation of the present invention.

Thus, it is shown that enhanced air-fuel mixing and thus improved engine performance can be achieved with the present invention. As is understood by a person skilled in the art, the preferred embodiments and example of the present invention are illustrative of the present invention rather than limiting of the present invention. Within the present invention and the preferred embodiments of the present invention the intake air deflector may be selected from the group including but not limited to baffles and shields (which may separate air intake ports and fuel injector ports otherwise on a single surface), as well as steps (which separate air intake ports and fuel injector ports on separate surfaces). Within the present invention and the preferred embodiment of the present invention, the intake air deflector protrudes into the combustion chamber (typically by a distance of from about 1 to about 25 millimeters, and the deflector is otherwise sized and positioned within the combustion chamber 12 such as to optimize during operation of the direct injection internal combustion engine mixing of air introduced into the combustion chamber through the air intake port and fuel directly injected into the combustion chamber through the fuel injector port.

Revisions and modifications may be made to methods, materials, structures and dimensions through which is provided a direct injection internal combustion engine in accord with the preferred embodiments and examples of the present invention while still providing additional embodiments and examples the present invention, further in accord with the accompanying claims.

What is claimed is:

1. A direct injection, spark ignition internal combustion engine having a minimum of one combustion chamber formed in a cylinder block, and having a cylinder head attached to the block, the chamber comprising:

a minimum of one air intake port formed in the cylinder head for introducing an air stream into the combustion chamber;

a fuel injection port formed in the cylinder head for directly injecting a fuel spray into the combustion chamber; and an intake air deflector formed in the cylinder head between said air intake port and said fuel injection port, said deflector sized and positioned such as to reduce said air stream impinging on said fuel spray during an intake stroke of the engine.

2. The engine as claimed in claim 1, wherein said intake air deflector is a baffle partially curved around said fuel injection port.

3. The engine as claimed in claim 2, wherein said intake air deflector has a height of about 1–25 millimeters.

4. The engine as claimed in claim 1, wherein said air stream and said fuel spray are simultaneously injected into the engine during said intake stroke.

5. A direct injection, spark ignition internal combustion engine having a minimum of one combustion chamber, the chamber comprising:

a minimum of one air intake port formed in a cylinder head for introducing an air stream into the combustion chamber;

a fuel injection port formed in said cylinder head for directly injecting a fuel spray into the combustion chamber; and means formed in said cylinder head between said air intake port and said fuel injection port for reducing said air stream impinging on said fuel spray.

6. The engine as claimed in claim 5, wherein said means for reducing said air stream impinging on said fuel spray comprise a deflector partially curved around said fuel injector port.

7. The engine as recited in claim 6 wherein said deflector has a height of about 1–25 millimeters.

8. A method of forming a homogeneous air-fuel mixture in a combustion chamber having a cylinder head of a direct injection spark ignition engine, the method comprising:

inducting an air stream into the combustion chamber, said air stream impinging on a first side of an intake air deflector formed on the cylinder head; and injecting a fuel spray into the combustion chamber, said fuel impinging on a second side of said intake air deflector.

9. The method recited in claim 8, wherein said intake air deflector has a height of about 1–25 millimeters.

10. The method recited in claim 9 wherein said air stream and said fuel are simultaneously injected into the combustion chamber.

11. A direct injection, spark ignition internal combustion engine having a cylinder block with a minimum of one combustion chamber, and a cylinder head attached to the block and closing off a top end of the chamber, the cylinder head comprising:

a lower plateau protruding into the combustion chamber, said plateau housing a minimum of one air intake port for inducting air into the combustion chamber; and an upper plateau housing a fuel injection port for directly injecting a fuel spray into the combustion chamber.

12. The engine claimed in claim 11, wherein said lower plateau separated by a step of about 1–25 millimeters in height from said upper plateau.

13. A method of forming a homogeneous air-fuel mixture in a combustion chamber having a cylinder head of a direct injection, spark ignition internal combustion engine, the method comprising:

inducting an air stream through an air intake port housed in a lower plateau protruding from the cylinder head into the combustion chamber; and simultaneously injecting a fuel spray through a fuel injection port housed in an upper plateau formed in the cylinder head and separated from the first plateau by a step of about 1–25 millimeters in height.

* * * * *